US008148975B2

(12) United States Patent
Yamazaki

(10) Patent No.: US 8,148,975 B2
(45) Date of Patent: Apr. 3, 2012

(54) PICKUP COIL FOR SENSING ROTARY SPEED OF ENGINE, THE COIL INCLUDING ADJUSTABLE WEIGHT MEMBER

(75) Inventor: Masaki Yamazaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 555 days.

(21) Appl. No.: 12/319,774

(22) Filed: Jan. 12, 2009

(65) Prior Publication Data

US 2009/0195240 A1 Aug. 6, 2009

(30) Foreign Application Priority Data

Jan. 31, 2008 (JP) ................................ 2008-021920

(51) Int. Cl.
*G01B 7/30* (2006.01)

(52) U.S. Cl. ............... 324/207.25; 324/207.15; 324/174

(58) Field of Classification Search . 324/207.15–207.25
See application file for complete search history.

(56) References Cited

U.S. PATENT DOCUMENTS

| | | | | |
|---|---|---|---|---|
| 5,097,242 | A * | 3/1992 | Onishi et al. | 336/192 |
| 2008/0137228 | A1 * | 6/2008 | Ueda et al. | 360/97.01 |
| 2008/0157611 | A1 * | 7/2008 | Ki | 310/81 |

FOREIGN PATENT DOCUMENTS

| | | | |
|---|---|---|---|
| JP | 11141600 | A * | 5/1999 |
| JP | 2006-266109 | | 10/2006 |

* cited by examiner

*Primary Examiner* — Jay Patidar
(74) *Attorney, Agent, or Firm* — Carrier Blackman & Associates, P.C.; William D. Blackman; Joseph P. Carrier

(57) ABSTRACT

A pickup coil includes a sensing unit having an iron core, a permanent magnet magnetically coupled to a rear end position of the iron core, and a coil for sensing a change of magnetic flux occurring in the iron core; and a supporting frame member. The sensing unit is molded with a cup-shaped resin case. The sensing unit is integrally molded with the supporting frame member and is mounted on a mounting object via the supporting frame member. A plurality of weight units for adjusting a characteristic frequency of the coil is stored in a weight storage section formed inside the resin case at a position spaced away from the supporting frame member. The weight storage section is sized such that one or more weight units are accommodated therein.

20 Claims, 5 Drawing Sheets

PICKUP COIL FOR SENSING ROTARY SPEED OF ENGINE, THE COIL INCLUDING ADJUSTABLE WEIGHT MEMBER

CROSS-REFERENCE TO RELATED APPLICATIONS

The present application claims priority under 35 USC §119 based on Japanese patent application No. 2008-021920, filed on Jan. 31, 2008. The entire subject matter of this priority document, including specification, claims and drawings, is incorporated by reference herein.

BACKGROUND OF THE INVENTION

1. Field of the Invention

The present invention relates to a non-contact type pickup coil. More particularly, the present invention relates to a pickup coil having adjustable characteristic frequency for accurately detecting number of revolutions and rotational position of engines.

2. Description of the Background Art

There are known pickup coils which are widely used as sensors for detecting the number of revolutions and the rotational position of engines in a non-contact manner. Such known pickup coils are generally mounted at a position near the engine, on a structural component which is subjected to an influence of engine vibrations. When a pickup coil is significantly vibrated, such as due to engine vibrations, detection signals might get noisy or distorted, which lowers detection accuracy of the pickup coil.

The Japanese Patent document JP-A-2006-266109 discloses a technology to integrate a center-of-gravity-position adjusting member in a pickup coil for adjusting the position of the center of gravity of the pickup coil in order to dampen vibrations of the pickup coil amplified by displacement between the position of the center of gravity of the pickup coil and the fixed position of a mounting object.

The pickup coil vibrates significantly, not only when the position of the center of gravity thereof and the fixed position of the mounting object do not match, but also when the engine vibrations match the characteristic frequency of the pickup coil. Hence, when this happens, the pickup coil resonates. However, in the related art described above, the problem of resonance of the pickup coil is caused when the engine vibrations and the characteristic frequency of the pickup coil match is not taken into consideration.

The present invention has been made to overcome such drawbacks of the existing pickup coils. Accordingly, it is one of the objects of the present invention to solve the above-described problem in the related art, and to provide a pickup coil having a resonant frequency which is easy to adjust to a desired characteristic frequency.

SUMMARY OF THE INVENTION

In order to achieve the above-mentioned objects, the present invention according to a first aspect thereof provides a pickup coil including a sensing unit (also referred as a sensor assembly) having an iron core, a permanent magnet magnetically coupled to a rear end of the iron core, and a coil for sensing a change of magnetic flux occurring in the iron core; and a supporting frame member. The iron core, the permanent magnet and the coil are integrally molded with the supporting frame member, and are mounted on a mounting object via the supporting frame member. A weight member is mounted in an end portion of the sensing unit spaced away from the supporting frame member.

The present invention according to a second aspect thereof is characterized in that the weight member is stored in a case member mounted on the sensing unit of pickup coil.

The present invention according to a third aspect thereof is characterized in that the weight member is integrally molded in the case member mounted on sensing unit of the pickup coil.

ADVANTAGES OF THE INVENTION

According to the present invention, the following advantages are achieved.

(1) As a result of mounting the weight member on the end portion of the sensing unit at a position spaced away from the supporting frame member of the pickup coil, the moment of inertia of the sensing unit increases according to the distance between the supporting frame member and the end portion of the sensing unit, and also according to the weight of the weight member, so that reduction of the characteristic frequency of the pickup coil is achieved.

(2) Since the weight member is stored in the case member mounted on the pickup coil, adjustment of the characteristic frequency is achieved by changing the number of the weight members (weight units), and/or by changing the weight of the weight members stored in the case member.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

It should be understood that only structures considered necessary for illustrating selected embodiments of the present invention are described herein. Other conventional structures, and those of ancillary and auxiliary components of the system, will be known and understood by those skilled in the art.

Figure 1:
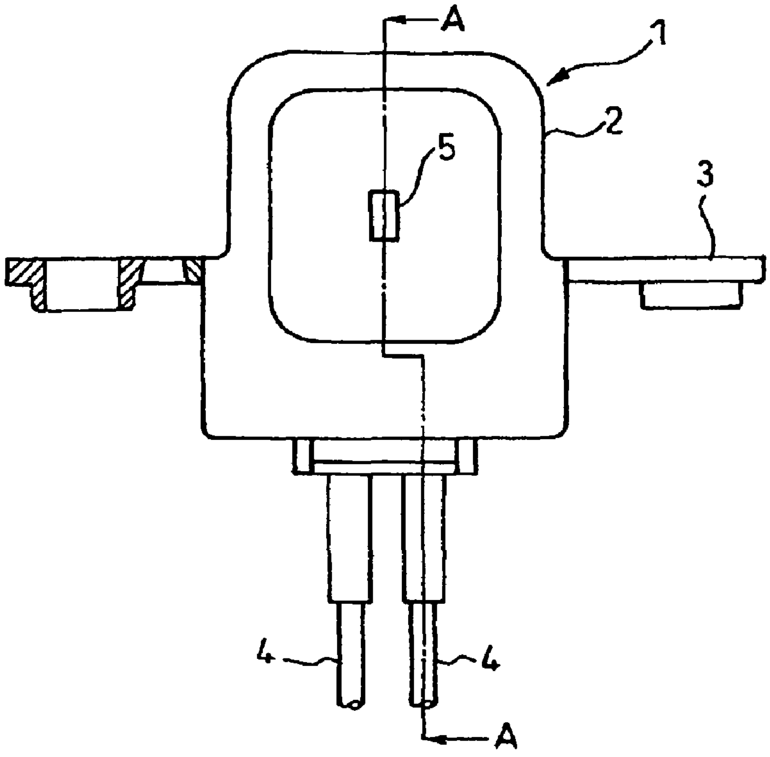
FIG. 1 is a front view of a pickup coil according to the present invention.
Figure 2:
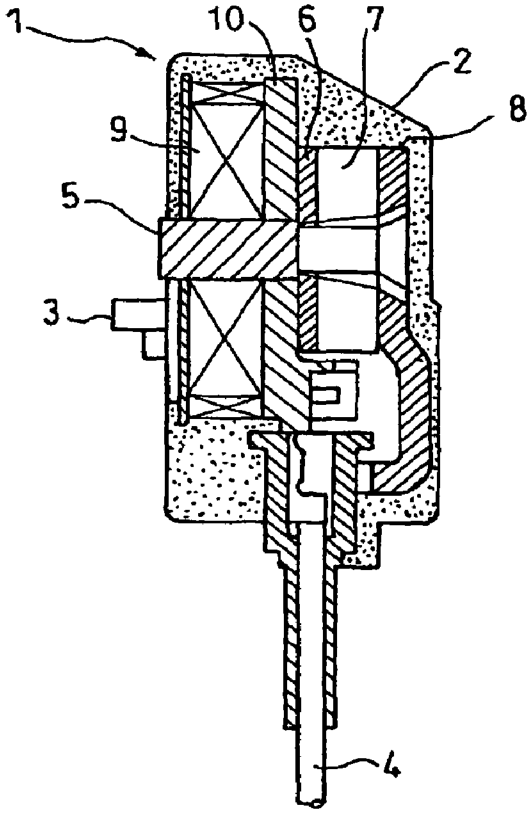
FIG. 2 is a partly exploded cross-sectional view of the pickup coil taken along the line A-A in FIG. 1.

Referring now to the drawings, illustrative embodiments of the present invention are described in detail. FIG. 1 is a front view of a pickup coil 1 of the present invention when viewed from a front opposing a truck of a rotor (not shown) having a guide strip (not shown) for a subject arranged thereon. FIG. 2 is a partly exploded cross-sectional view taken along a line A-A in FIG. 1.

As shown in FIG. 1, the pickup coil 1 includes a sensing unit (also referred as a sensor assembly) 2 coated with resin, a supporting frame 3 for use in fixing the sensing unit 2 to a mounting object, such as an engine or a vehicle body, with a bolt, and a pair of lead wires 4 extending from the sensing unit 2 to the outside.

The sensing unit 2 of the pickup coil 1, as exemplified in FIG. 2, includes a magnetic iron core 5 having a rectangular columnar shape arranged along the fore-and-aft direction, a permanent magnet 7 magnetically coupled with a rear end portion of the iron core 5 via a core plate 6, a base plate 8 magnetically coupled with the permanent magnet 7, a bobbin 10 which allows the iron core 5 to penetrate therethrough, and a coil 9 wound around the bobbin 10.

Every time the guide strip passes near the magnetic core 5, a pulsed voltage is induced by the coil 9 and is outputted from the lead wires 4.

Figure 3:
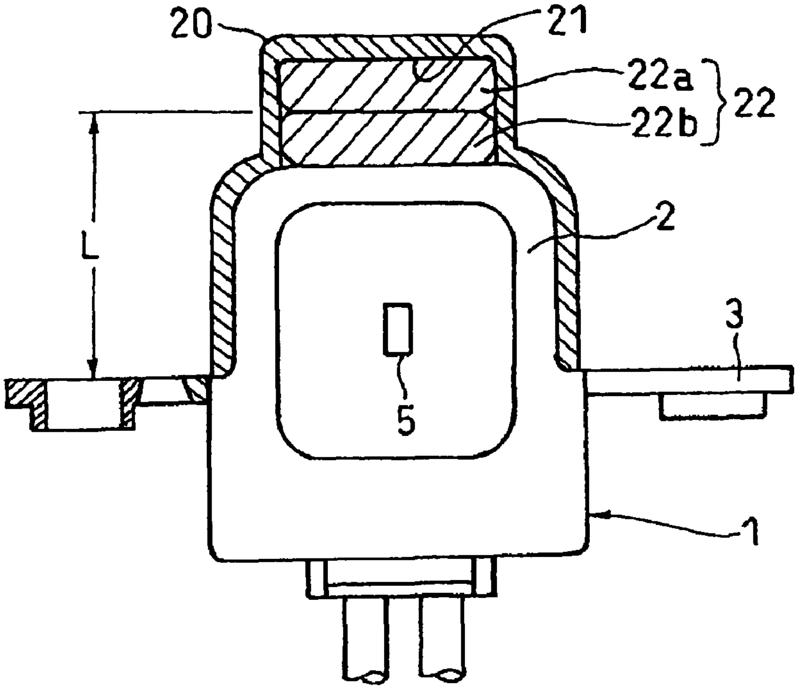
FIG. 3 is a front view of a first embodiment, having two weight units, of the pickup coil according to the present invention.
Figure 4:
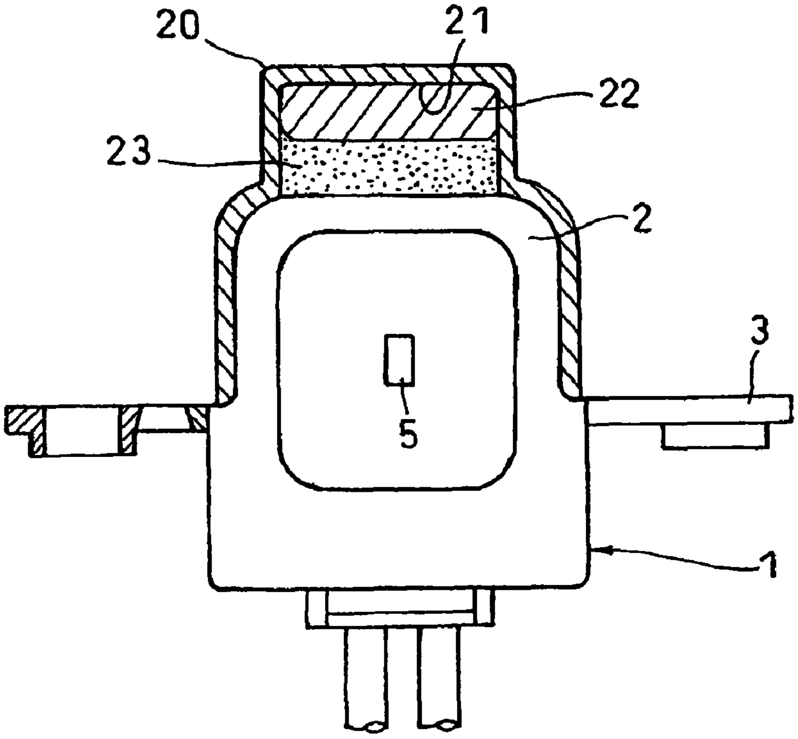
FIG. 4 is a front view of a first embodiment, having one weight unit, of the pickup coil according to the present invention.

FIGS. 3 and 4 are front views of the pickup coil according to a first illustrative embodiment of the present invention.

In the first illustrative embodiment, the sensing unit 2 of the pickup coil 1 is molded in a cup-shaped resin case 20, and a plurality of weight units 22, for adjusting the characteristic frequency of the pickup coil 1, are stored in a weight storage section 21, secured inside the resin case 20 at a location above the top of the sensing unit 2. Accordingly, in this embodiment, the weight units 22 are mounted on the pickup coil 1 at an end portion sensing unit 2 apart from, i.e., spaced away from, the supporting frame 3.

Figure 9:
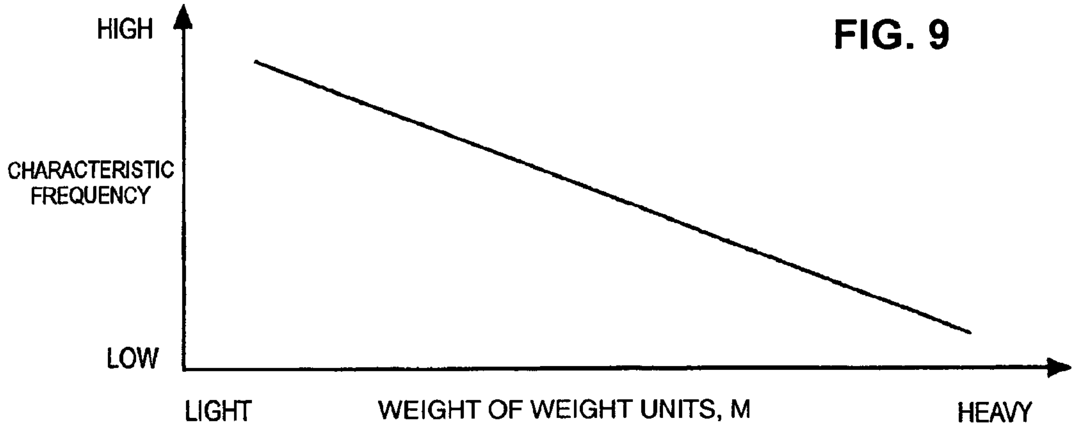
FIG. 9 is a graph showing a relationship between the weight of the weight units mounted on the pickup coil and the characteristic frequency.

FIG. 9 shows a relationship between magnitude of a weight M of the weight units 22, mounted on the pickup coil 1, and the characteristic frequency. In this illustrative embodiment, since the moment of inertia increases according to a distance L between the supporting frame 3 and the weight units 22, and also according to the weight M of the weight units 22, the characteristic frequency of the pickup coil 1 is reduced as weight is increased.

In this embodiment, since the capacity of the weight storage section 21 is set to a size which allows storage of a plurality of weight units 22*a* and 22*b*, as shown in FIG. 3, adjustment of the characteristic frequency of the pickup coil 1 is achieved, as desired, by changing the number and/or the size of the weight units 22 stored in the weight storage section.

When storing a smaller number of weight units 22, e.g., one weight unit 22, in the weight storage section 21 which generally accommodates the two weight units 22 (22*a*, 22*b*), as shown in FIG. 4 as an example, it is preferable to fix the weight 22 in the interior of the weight storage section 21 by filling an epoxy based resin 23 or the like in a vacant space of the weight storage section 21.

Figure 5:
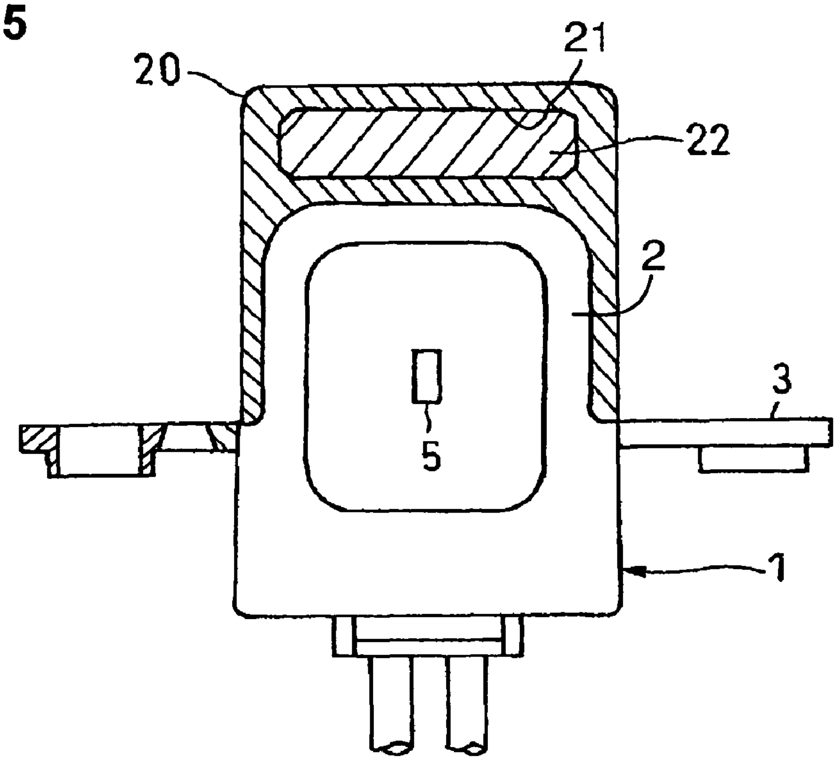
FIG. 5 is a front view of a pickup coil according a second embodiment of the present invention.

FIG. 5 is a front view of the pickup coil according to a second illustrative embodiment of the present invention.

In the embodiment of FIG. 5, the sensing unit 2 of the pickup coil 1 is molded in the cup-shaped resin case 20, and the weight units 22, for adjusting the characteristic frequency of the pickup coil 1, are insert-molded in the weight storage section 21, secured inside the resin case 20 at a location above the top of the sensing unit 2.

Accordingly, in this second embodiment as well, the weight units 22 are mounted on the pickup coil 1 at the end portion of the sensing unit 2, at a position spaced away from the supporting frame 3.

According to this illustrative embodiment, since the weight units 22 are integrated in the interior of the resin case 20 by insert molding, no separate process, to fix the weight units 22 to the pickup coil 1 or the resin case 20, is required.

In this embodiment, a plurality of the resin cases 20 having the different number of weight units to be insert-molded are prepared in advance, and a suitable resin case 20 for molding the sensing unit 2 of the pickup coil 1 is selected, as needed, according to the characteristic frequency required for the pickup coil 1.

Figure 6:
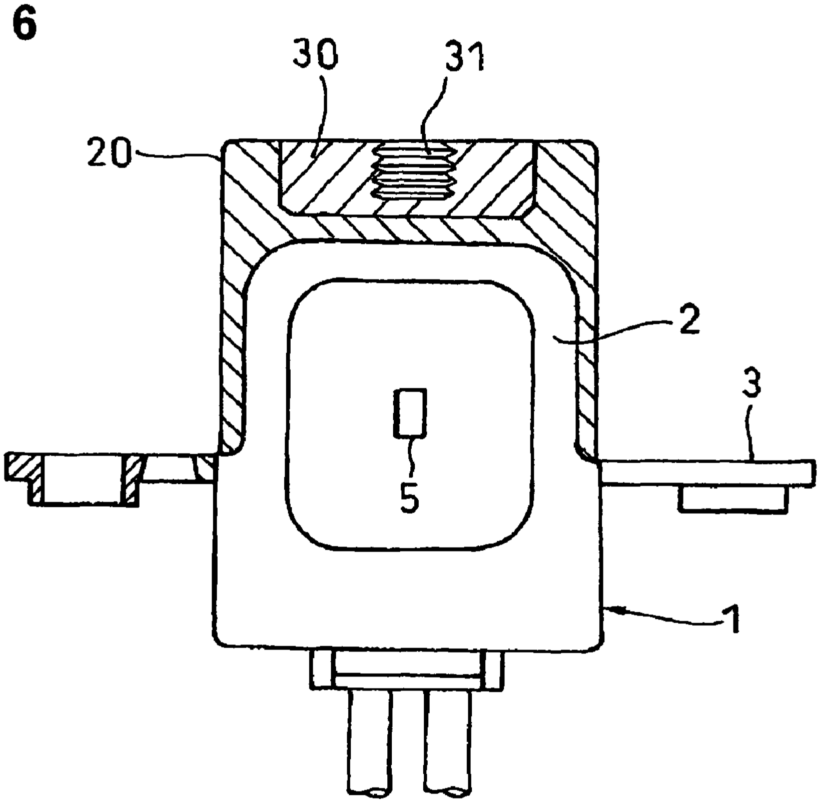
FIG. 6 is a front view of a pickup coil according a third embodiment of the present invention.
Figure 7:
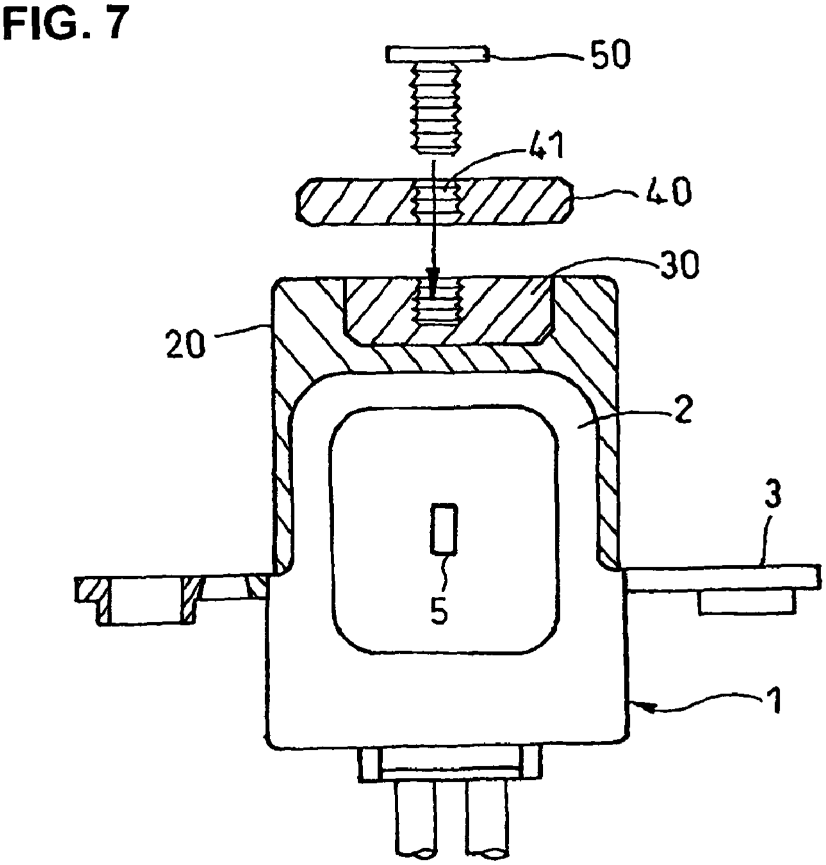
FIG. 7 is an exploded view of an additional weight and a screw of the pickup coil according a third embodiment of the present invention.
Figure 8:
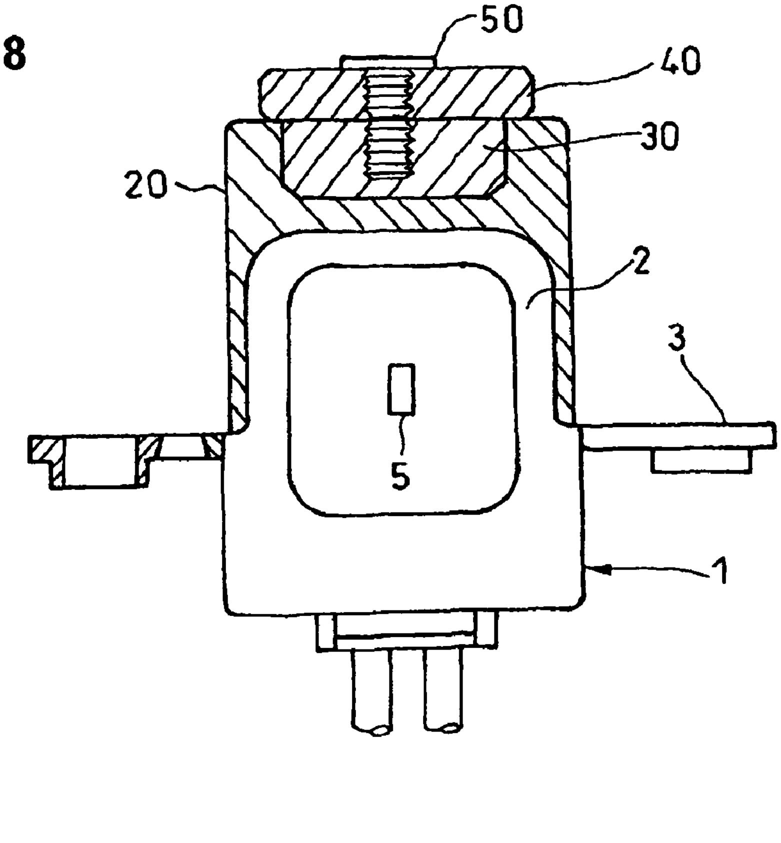
FIG. 8 is a view of the additional weight and the screw of the pickup coil in an assembled form according a third embodiment of the present invention.

FIGS. 6, 7, and 8 are front views of the pickup coil according to a third illustrative embodiment of the present invention.

According to the third illustrative embodiment, an insert nut 30 having a screw hole (a threaded hole) 31 is insert-molded on top portion of the cup-shaped resin case 20, which is molded to cover the sensing unit 2 of the pickup coil 1, so as to expose the threaded hole 31 as shown in FIG. 6. Accordingly, the insert nut 30, which also serves as the weight, is mounted on the pickup coil 1 at the end portion of the sensing unit 2, at a position spaced away from the supporting frame 3.

According to the third illustrative embodiment, the insert nut 30 functions as a weight unit. In addition, when the characteristic frequency cannot be lowered to a desired range by the insert nut 30, an additional weight 40 having a threaded hole 41 formed therein is secured to the insert nut 30 using a threaded bolt (screw) 50, as shown in FIGS. 7 and 8. The threaded bolt 50 has external threads formed thereon corresponding to the threads of each of the insert nut 30 and the addition.

In the third illustrative embodiment, the characteristic frequency of the pickup coil 1 is adjusted to a desired range by adjusting and securing one or more the additional weight units 40 with the insert nut 30 by the bolt 50.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A pickup coil comprising
a sensing unit,
a supporting frame member,
a case member attached to said sensing unit, and
a weight member arranged in said case member;
said sensing unit comprising:
an iron core;
a permanent magnet magnetically coupled to the iron core; and
a coil for sensing a change of magnetic flux occurring in the iron core;
wherein the iron core, the permanent magnet, and the coil are integrally molded with the supporting frame member, and are configured to be mounted on a mounting object via the supporting frame member;
wherein the weight member is mounted on said case member arranged on an end portion of the sensing unit, which is located at a position spaced away from the supporting frame member;
wherein said weight member has a threaded hole formed therein, and wherein said weight member is to receive at least one additional weight member and secure said at least one additional weight member thereto.

2. The pickup coil according to claim 1, wherein the weight member is fixedly stored in said case member mounted on the sensing unit.

3. The pickup coil according to claim 1, wherein the weight member is integrally molded in said case member mounted on the sensing unit.

4. The pickup coil according to claim 2, wherein said weight member comprises an insert nut.

5. The pickup coil according to claim 4, wherein a weight of said weight member is selectively adjusted for achieving a desired characteristic frequency of said coil.

6. The pickup coil according to claim 1, wherein the weight member is insert-molded in said case member mounted on the sensing unit.

7. The pickup coil according to claim 1, wherein said at least one additional weight member is threadably attached to said weight member.

8. The pickup coil according to claim 2, wherein said case member is formed of material comprising a plastic resin.

9. A pickup coil for sensing a rotary speed of an engine, said pickup coil comprising:

a sensing unit;

a case member attached to said sensing unit;

a weight member arranged in said case member; and a supporting frame member attached to said sensing unit; and said case member attached to an end portion of the sensing unit at a position spaced away from said supporting member; said weight member comprising at least one weight unit;

wherein said sensing unit is disposed in a molded cup-shaped resin case;

wherein said weight case member is operatively attached to said resin case;

wherein said weight unit has a threaded hole formed therein, and wherein said weight unit is to receive at least one additional weight unit and secure said at least one additional weight unit thereto.

10. A pickup coil according to claim 9, wherein said sensing unit comprises:

a magnetic iron core having a rectangular columnar shape;

a core plate;

a permanent magnet magnetically coupled with a rear end portion of the iron core via said core plate;

a base plate magnetically coupled with the permanent magnet;

a bobbin having an opening formed therein which receives said iron core therethrough; and a coil wound around said bobbin.

11. A pickup coil according to claim 10, wherein a weight of said weight unit is selected so as to achieve a desired characteristic frequency of the coil.

12. A pickup coil according to claim 9, wherein said weight member comprises an insert nut having said threaded hole formed therein.

13. A pickup coil according to claim 9, wherein said cup-shaped resin case has said case member having a weight storage section formed therein, and wherein the weight member is integrally molded inside said weight storage section.

14. A pickup coil according to claim 9, wherein:

said at least one weight unit has a hole formed therein; and said least one weight unit is secured to said weight member using a bolt.

15. A pickup coil according to claim 14, wherein said weight member is an insert nut and wherein a weight of a combination of said insert nut and said at least one weight unit forms a total weight of said weight member.

16. A pickup coil for sensing a rotary speed of an engine, said pickup coil comprising:

a sensor assembly disposed in a molded cup-shaped resin case, said sensor assembly comprising an iron core having a rectangular columnar shape;

a permanent magnet magnetically coupled with the iron core;

a base plate magnetically coupled with the permanent magnet;

a bobbin having said iron core penetrated therethrough; and a coil wound around said bobbin;

a supporting frame member attached to said sensor assembly;

a case member attached to said sensing unit; and a weight member disposed in said case member arranged to an end portion of the sensor assembly at a position spaced away from the supporting member, said weight member comprising first weight unit;

wherein said first weight unit has a threaded hole formed therein, and is to receive a second weight unit and secure said second weight unit thereto.

17. A pickup coil according to claim 16, wherein a weight of said weight member is selected so as to achieve a desired characteristic frequency of the coil.

18. A pickup coil according to claim 16, wherein said second weight unit has a threaded hole formed therein.

19. A pickup according to claim 16, wherein said resin case includes said case member having a weight storage section formed therein for receiving the first weight unit therein, and wherein said weight member is integrally molded in said weight storage section.

20. A pickup coil according to claim 16, wherein:

said first weight unit is an insert nut having a hole formed therein; and said second weight unit is secured with said insert nut by using a bolt.

* * * * *